United States Patent
Weiner et al.

(10) Patent No.: US 9,581,727 B1
(45) Date of Patent: Feb. 28, 2017

(54) SEVERE WEATHER SITUATIONAL AWARENESS SYSTEM AND RELATED METHODS

(71) Applicant: HARRIS CORPORATION, Melbourne, FL (US)

(72) Inventors: Allan M. Weiner, Melbourne, FL (US); Brian J. Haman, West Melbourne, FL (US); Justin R. Sanchez, Palm Bay, FL (US)

(73) Assignee: HARRIS CORPORATION, Melbourne, FL (US)

( * ) Notice: Subject to any disclaimer, the term of this patent is extended or adjusted under 35 U.S.C. 154(b) by 0 days.

(21) Appl. No.: 15/003,935

(22) Filed: Jan. 22, 2016

(51) Int. Cl.
- *G01W 1/00* (2006.01)
- *G01W 1/10* (2006.01)
- *G01S 13/95* (2006.01)
- *G08B 21/18* (2006.01)

(52) U.S. Cl.
CPC ............ *G01W 1/10* (2013.01); *G01S 13/951* (2013.01); *G08B 21/18* (2013.01)

(58) Field of Classification Search
CPC ........... G01W 1/02; G08B 21/02; G01S 13/95
USPC ............ 340/601, 539.1, 600, 580, 584, 602; 702/3
See application file for complete search history.

(56) References Cited

U.S. PATENT DOCUMENTS

| | | |
|---|---|---|
| 7,191,064 B1 | 3/2007 | Myers et al. |
| 7,391,358 B2 | 6/2008 | Dupree et al. |
| 7,515,088 B1 | 4/2009 | Woodell et al. |
| 7,983,843 B1 | 7/2011 | Neilley et al. |
| 8,452,537 B2 | 5/2013 | Havin et al. |
| 8,930,299 B2 | 1/2015 | Pyle et al. |
| 2011/0046809 A1* | 2/2011 | Fickey .................. H02H 5/005 700/293 |

(Continued)

FOREIGN PATENT DOCUMENTS

CN 102073069 5/2011

OTHER PUBLICATIONS

NUCAPS demonstration at the HWT 2015 Spring Experiment http://www.star.nesdis.noaa.gov/star/documents/meetings/2015JPSSAnnual/dayFour/13_Session7b_Line_HWT-NUCAPS.pdf pp. 22.

(Continued)

*Primary Examiner* — Phung Nguyen
(74) *Attorney, Agent, or Firm* — Allen, Dyer, Doppelt, Milbrath & Gilchrist, P.A.

(57) ABSTRACT

A severe weather detection and warning method may include collecting atmospheric sounding data from at least one satellite atmospheric sounding device corresponding to a grid of localized regions, with the atmospheric sounding data including geospatial location and elevation components. The method may further include collecting weather radar data for the grid of localized regions from at least one radar station, determining a location and direction of travel of at least one moisture system based upon the weather radar data, and determining respective atmospheric instability levels for the localized regions based upon the atmospheric sounding data. The method may also include determining when the direction of travel of the at least one moisture system is approaching a given localized region having an atmospheric instability level above an instability threshold, and generating a severe weather warning indication based thereon.

20 Claims, 5 Drawing Sheets

(56) References Cited

U.S. PATENT DOCUMENTS

| | | | | |
|---|---|---|---|---|
| 2014/0300510 | A1* | 10/2014 | Mills | G01W 1/04 |
| | | | | 342/26 A |
| 2015/0206330 | A1* | 7/2015 | Takechi et al. | G01W 1/02 |
| | | | | 345/629 |
| 2015/0364027 | A1* | 12/2015 | Haupt et al. | G01W 1/02 |
| | | | | 340/521 |

OTHER PUBLICATIONS

Tempus Global Data "Tempus Global Data has combined the very best of weather observation in space with a big data approach" http://www.tempusglobaldata.com: retrieved from internes Oct. 28, 2015: pp. 4.

Green et al. "Observations of stable layers in the troposphere and stratosphere using VHF radar" Radio Science; vol. 156, issue 2; Mar.-Apr. 1980; pp. 395-405.

"CRIS" Harris Press Release; http://harris.com/view_pressrelease. asp?act=lookup<_id=3800; retrieved from internet Oct. 28, 2015; pp. 2.

\* cited by examiner

SEVERE WEATHER SITUATIONAL AWARENESS SYSTEM AND RELATED METHODS

TECHNICAL FIELD

The present invention relates to weather monitoring systems and, more particularly, to severe weather detection and warning systems and related methods.

BACKGROUND

Weather tracking and forecasting is very important for protecting life and property from severe weather systems. One important component in weather tracking and forecasting is weather radar. In the U.S., the National Weather Service (NWS), Federal Aviation Administration (FAA), and the U.S. Air Force operate a network of ground-based Doppler weather radars called NEXRAD (Next-Generation Radar). The NEXRAD system utilizes radar scan data to detect precipitation in the atmosphere as well as its movement. Data from the various NEXRAD stations may be combined to display regions of precipitation moving across a map.

Other types of devices are also used for monitoring and forecasting weather systems, such as spaced-based (i.e., satellite) imaging or scanning devices. One such device is an infrared scanner, which captures images in the infrared band of light and shows the relative warmth of objects. Infrared imagery is useful for determining cloud features during both daytime and nighttime. Other forms of satellite imaging may be taken using a wavelength sensitive to the content of water vapor in the atmosphere, which can indicate the presence of both high moisture content and/or ice crystals. Water vapor imagery is useful for determining both locations of moisture and atmospheric circulations.

With the information provided by radar or other weather imaging tools, forecasters attempt to predict when and where sever weather will occur. Numerical weather prediction (NWP) uses mathematical models of the atmosphere and oceans to predict the weather based on the measured weather conditions. While NWP modeling can be helpful, such modeling generally requires a large amount of computing power to process the voluminous data sets and complex equations required for such modeling. Moreover, NWP modeling may not provide the accuracy or granularity required for certain applications.

SUMMARY

A severe weather detection and warning method may include collecting atmospheric sounding data from at least one satellite atmospheric sounding device corresponding to a grid of localized regions, with the atmospheric sounding data including geospatial location and elevation components. The method may further include collecting weather radar data for the grid of localized regions from at least one radar station, determining a location and direction of travel of at least one moisture system based upon the weather radar data, and determining respective atmospheric instability levels for the localized regions based upon the atmospheric sounding data. The method may also include determining when the direction of travel of the at least one moisture system is approaching a given localized region having an atmospheric instability level above an instability threshold, and generating a severe weather warning indication based thereon.

More particularly, the method may also include generating image display data representative of the direction of travel of the at least one moisture system and the severe weather warning indication. Moreover, the method may include streaming the image display data to at least one remote electronic device. Additionally, the at least one remote electronic device may have a device geolocation associated therewith, and streaming the image display data may include streaming image display data for the device geolocation.

Determining when the direction of travel of the at least one moisture system is approaching the given localized region having the instability level above the instability threshold may be performed without using numerical weather prediction (NWP) modeling. By way of example, the localized regions may be less than five kilometers squared. Furthermore, the atmospheric sounding data may comprise at least one of temperature data, moisture data and pressure data, for example. Additionally, the atmospheric sounding data may comprise at least one of hyperspectral data and microwave data, for example.

By way of example, the atmospheric sounding data may be collected every ten minutes or less. Also, the at least one radar station may comprise at least one ground-based radar station.

A related severe weather detection and warning system may include at least one satellite atmospheric sounding device for collecting atmospheric sounding data corresponding to a grid of localized regions, with the atmospheric sounding data including geospatial location and elevation components, and at least one radar station for collecting weather radar data for the grid of localized regions. The system may further include a server for determining a location and direction of travel of at least one moisture system based upon the weather radar data, determining respective atmospheric instability levels for the localized regions based upon the atmospheric sounding data, and determining when the direction of travel of the at least one moisture system is approaching a given localized region having an atmospheric instability level above an instability threshold, and generating a severe weather warning indication based thereon.

A severe weather detection and warning server, such as the one described briefly above, is also provided.

DETAILED DESCRIPTION OF THE EMBODIMENTS

The present disclosure is provided with reference to the accompanying drawings, in which various embodiments are shown. However, other embodiments in many different forms may be used, and the disclosure should not be construed as limited to the particular embodiments set forth herein. Rather, these embodiments are provided so that this disclosure will be thorough and complete, and will fully convey the claim scope to those skilled in the art. Like numbers refer to like elements throughout.

Figure 1:
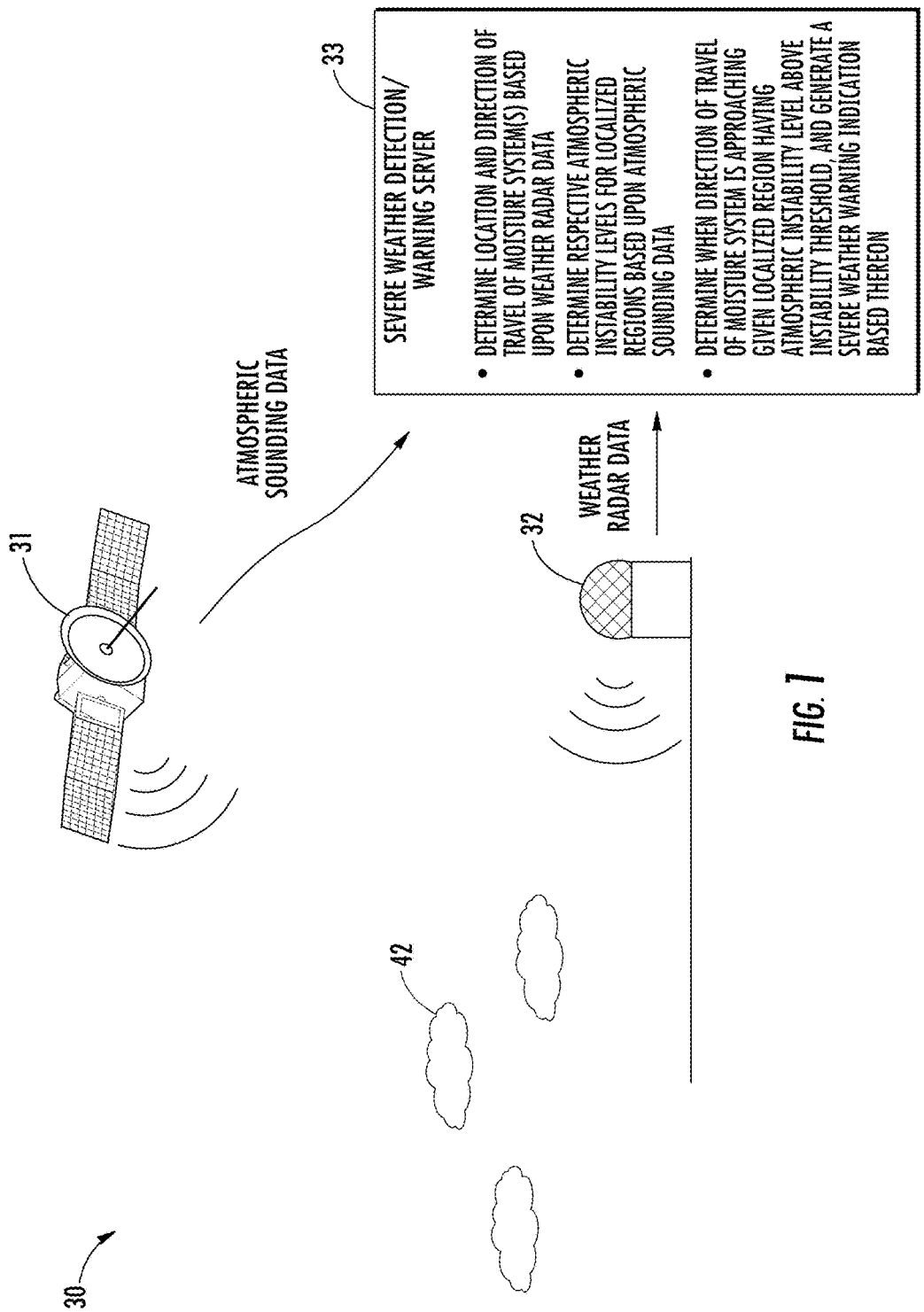
FIG. 1 is a schematic block diagram of a severe weather detection and warning system in accordance with an example embodiment.
Figure 2:
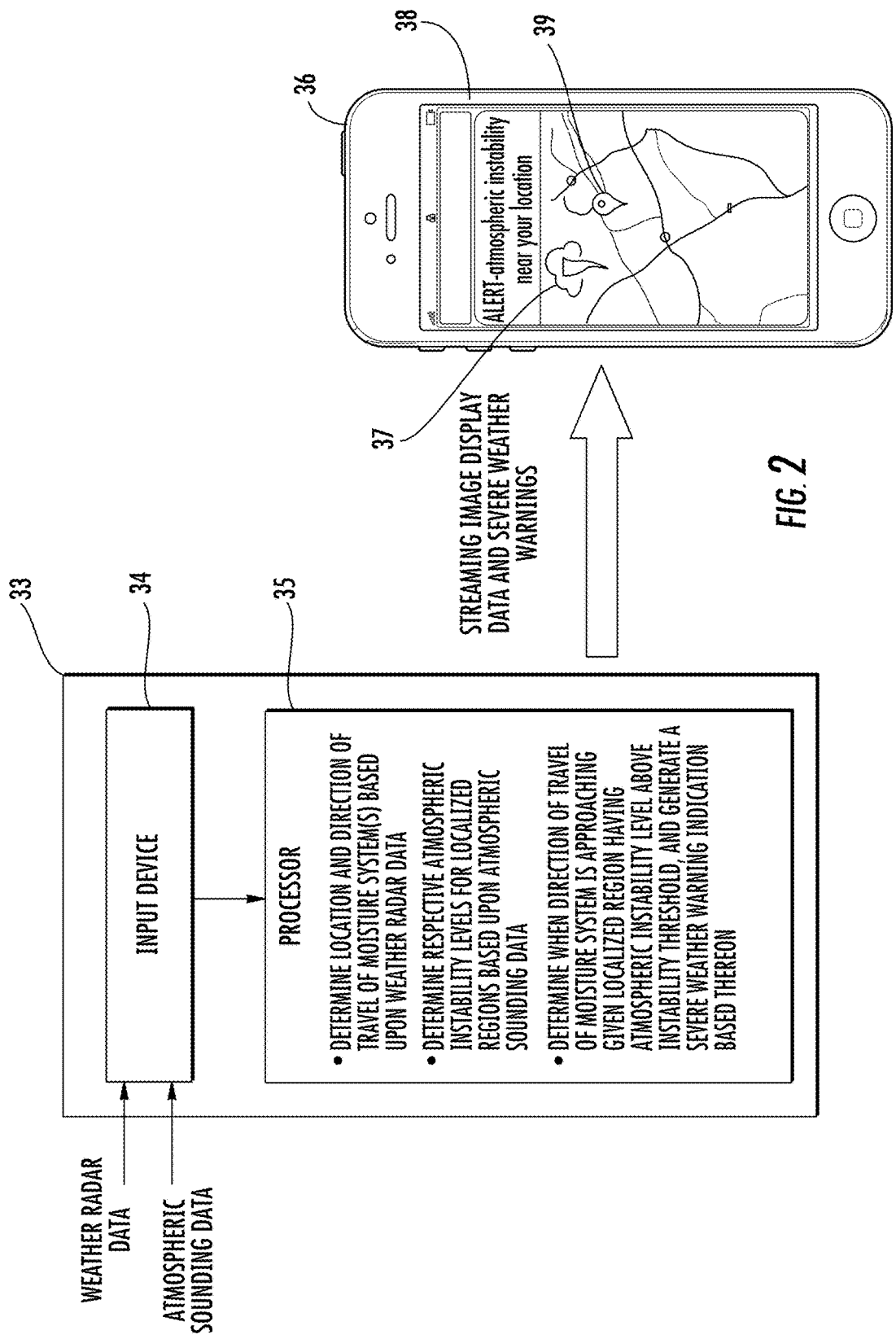
FIG. 2 is a schematic block diagram of the server of the system of FIG. 1 providing streaming image display data and server weather warnings to a remote mobile electronic device.
Figure 3:
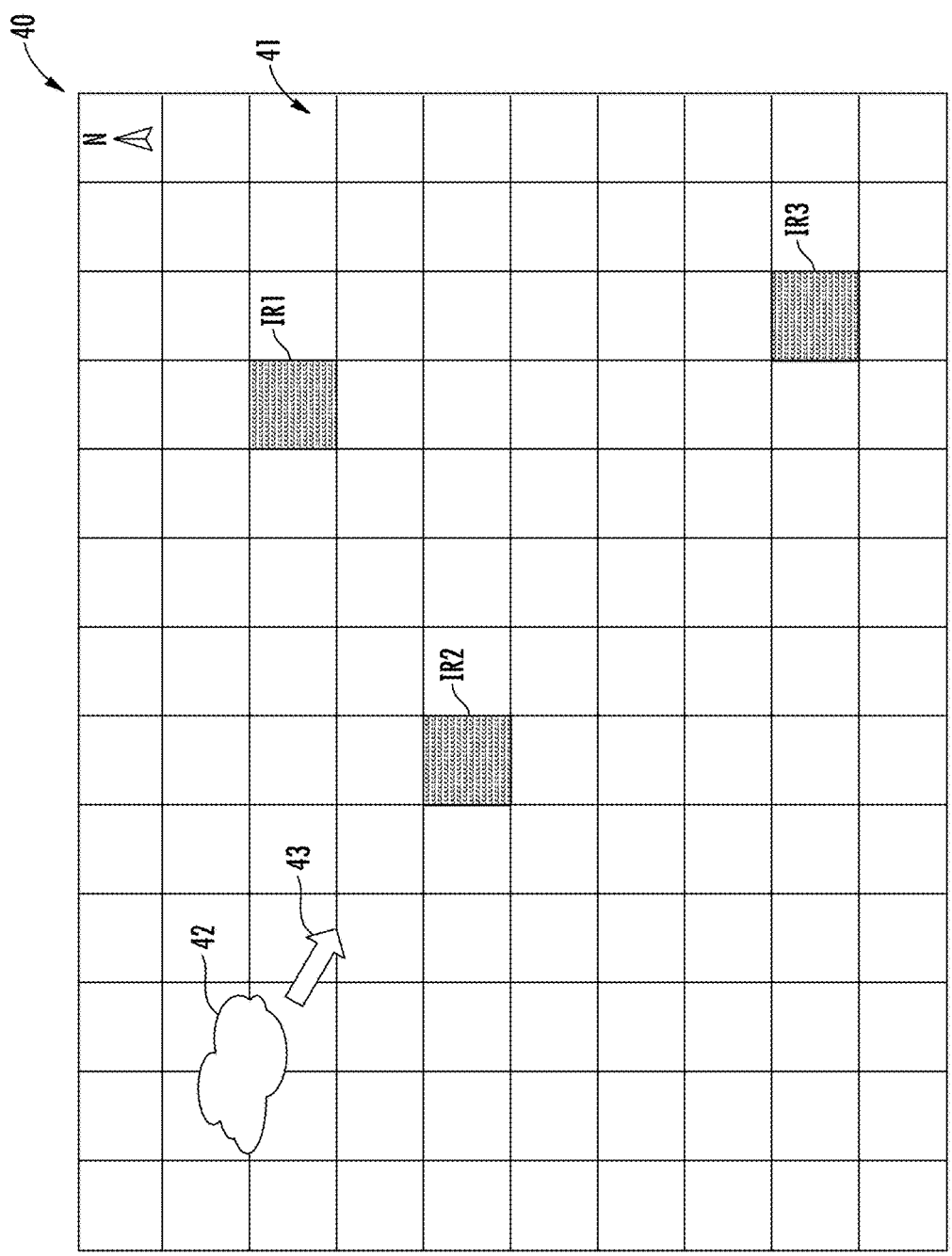
FIGS. 3 and 4 are schematic diagrams illustrating operation of the system of FIG. 1 when the direction of travel of a moisture system is approaching a given localized region having an atmospheric instability level above an instability threshold.
Figure 4:
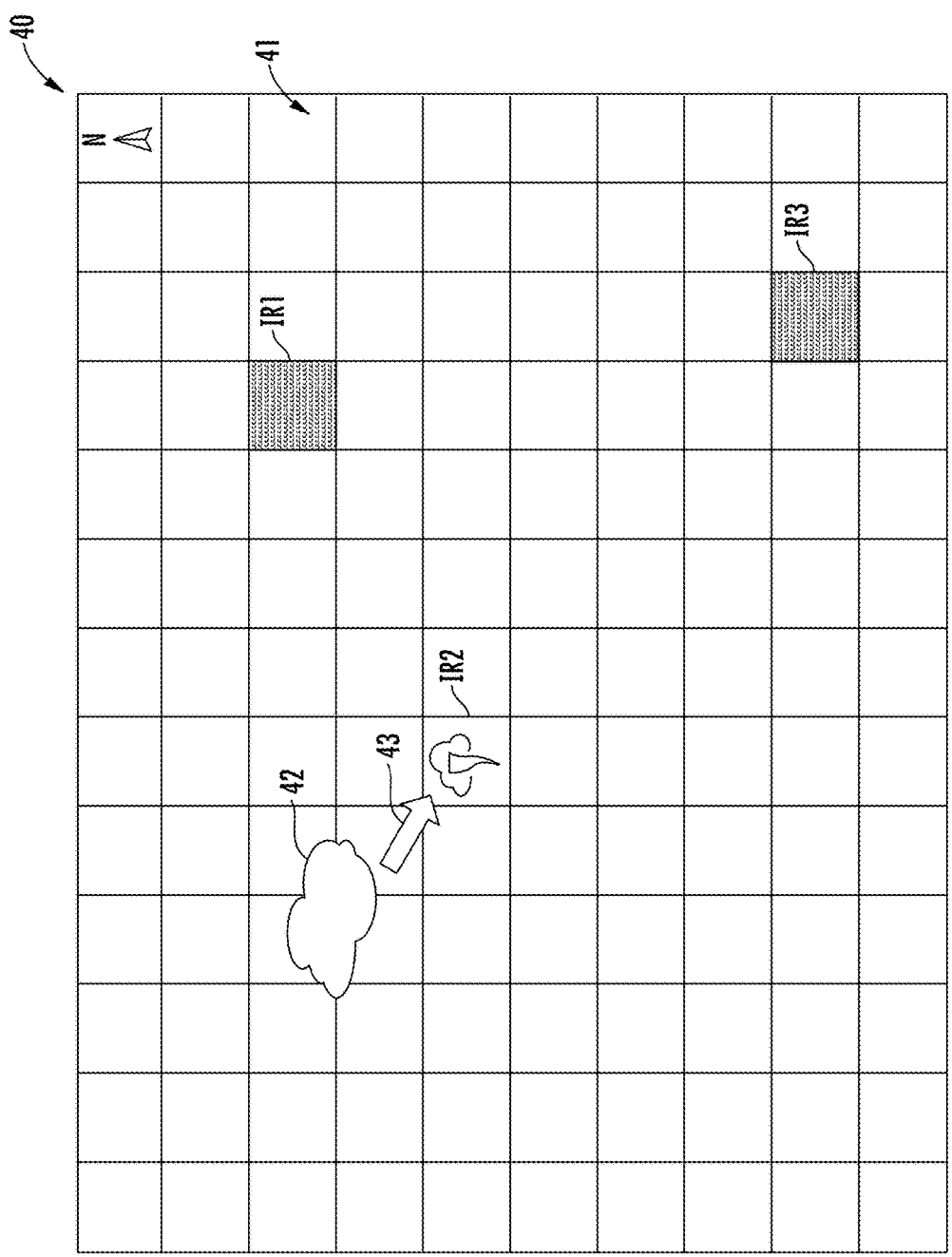

Referring now to FIGS. 1-5, a severe weather detection and warning system 30 is first described which may advantageously provide accurate near-term situational awareness of approaching severe weather and areas of atmospheric instability. The system 30 illustratively includes one or more satellite atmospheric sounding devices 31 for collecting atmospheric sounding data corresponding to a grid 40 of localized regions 41, with the atmospheric sounding data including geospatial location and elevation components. In the examples of FIGS. 3 and 4, the grid 40 is shown as a graphical representation, as it may appear on a weather map on a computer or mobile electronic device display, for example. However, it should be noted that the information disclosed herein need not always be shown on a display in all applications (e.g., warnings may be generated without a graphical representation of the affected localized region(s) 41, as will be discussed further below).

Generally speaking, the satellite atmospheric sounding devices 31 may be earth-observing satellites with sensor capabilities to collect atmospheric soundings (e.g., temperature, moisture content, etc.) at a high refresh rate, spatial resolution and a plurality of frequency bands. By way of example, one such satellite weather sounding platform is the Cross Track Infrared Sounder (CrIS) instrument from Harris Corporation of Melbourne, Fla. Satellites equipped with CrIS may be used to measure atmospheric profiles for temperature, moisture, and pressure from space to the Earth's surface. Called "soundings", such measurements are commonly used for global weather models, which directly impact two- to seven-day weather forecasts in the U.S. However, the sounding accuracy of CrIS is beyond the capabilities of previous operational sounders. Sounders work by measuring the energy through an atmospheric column from the ground up through the clouds. Typical sounders provide approximately 19 slices of the column, whereas the CrIS instrument may take more than 1,000 slices, which provides significantly more detailed information about moisture, temperature, and pressure.

With the CrIS system, the granularity of measurements within the column may not only be greatly increased, but the granularity of the coverage area may be as well. That is, the resolution of this system may allow for the grid 40 to have localized regions 41 of a size that is about 5 km×5 km or less, and more particularly about 4 km×4 km, although other localized region sizes may be used in different embodiments. Moreover, it should also be noted that other suitable satellite-based sounding systems besides CrIS may be used in different embodiments as well. Currently CrIS is deployed on a polar satellite platform that revisits a point on Earth twice per day near the equator, with a maximum of 14 times per day at the poles. However, using instruments such as CrIS on geostationary satellites will allow it to "stare" at a single point or region and reimage every few minutes, thus allowing the severe weather detection and warning system 30 to advantageously provide accurate near-term situational awareness of approaching severe weather and areas of atmospheric instability in close to real time.

The system 30 further illustratively includes one or more radar stations 32 for collecting weather radar data for the grid 40 of localized regions 41. By way of example, the radar stations 32 may be NEXRAD or other radar stations which may track moisture in the atmosphere.

The system 30 also illustratively includes one or more severe weather detection and warning servers 33 including an input device 34 which receives the atmospheric sounding data from the satellite atmospheric sounding devices 31 and the weather radar data from the radar stations 32. A processor 35, which may be implemented using a combination of hardware (e.g., microprocessor, etc.) and a non-transitory computer-readable medium having computer-executable instructions for performing the operations described herein may be used to implement the server 33, for example. It should also be noted that while a single server 33 is shown in the drawings for clarity of reference, the various server operations described herein may be shared among a number of different servers or processors, which are either co-located or geographically distributed, such as in a computing cloud, for example.

Figure 5:
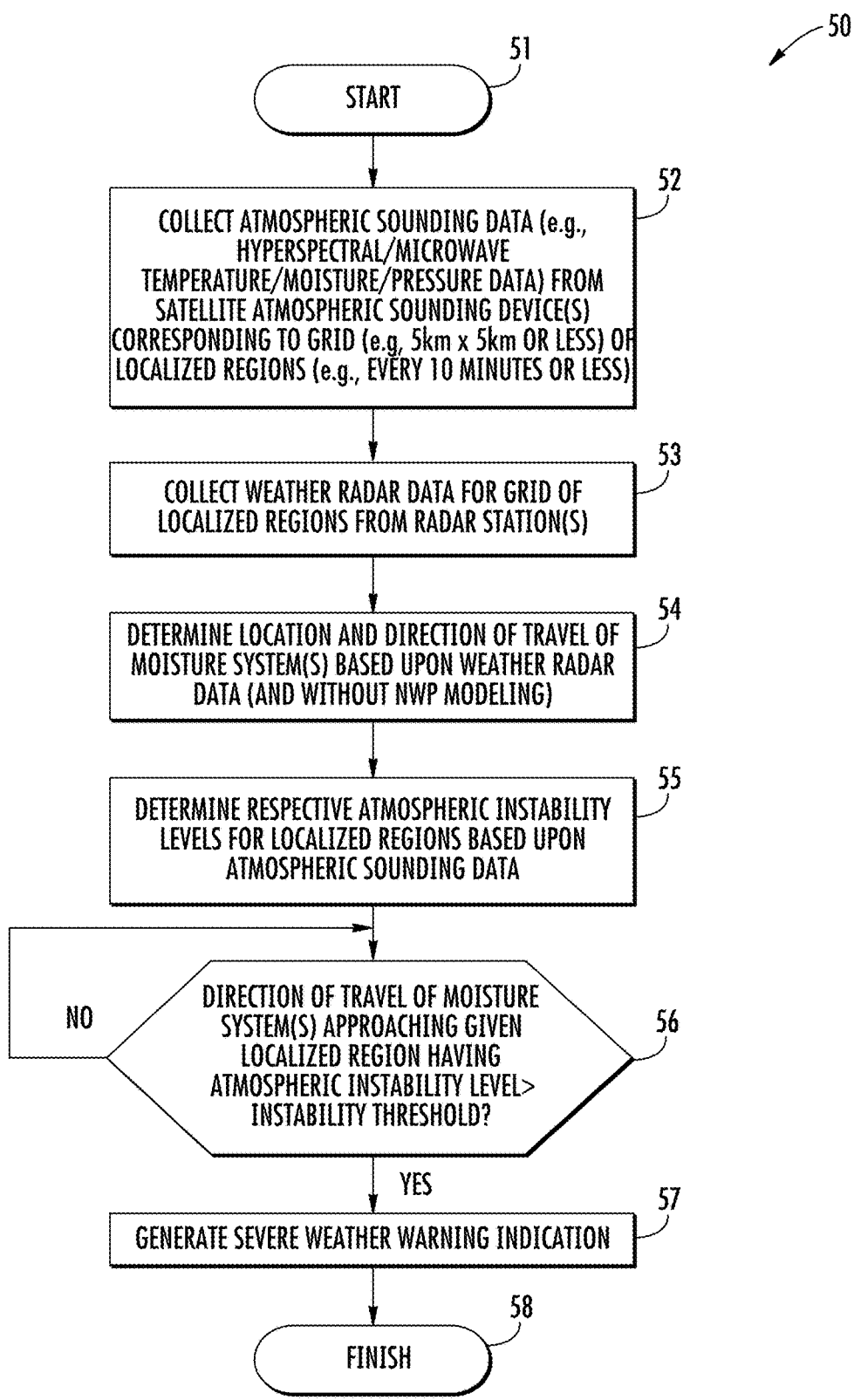
FIG. 5 is a flow diagram illustrating method aspects associated with the system of FIG. 1.

Referring additionally to the block diagram 50 of FIG. 5, operations which may be performed by the server 33 are now described. Beginning at Block 51, after collection of the atmospheric sounding data and weather radar data, at Blocks 52-53, the processor 35 determines a location and direction of travel of one or more moisture systems 42 based upon the weather radar data, at Block 54. In the examples of FIGS. 3 and 4, the arrow 43 indicates the direction of travel of the moisture system 42, which is generally in a southeasterly direction in the illustrated example.

Furthermore, the processor 35 also determines respective atmospheric instability levels for the localized regions 41 based upon the atmospheric sounding data, at Block 55, and determines when the direction of travel of a given moisture system 42 is approaching a localized region having an atmospheric instability level above an instability threshold, at Block 56. In the present example, three localized regions 41 within the illustrated grid 40 have an atmospheric instability level above the instability threshold, which is indicated by wavy lines and referred to as instability regions IR1-IR3. Here, the moisture system 42 is approaching the instability region IR2, and in FIG. 4 when this determination is made a severe warning indication is provided (Block 57) in the form of a visual indication (here a weather cloud with a tornado). Other visual indicators, as well as audible indicators, may be used as well. The method of FIG. 5 illustratively concludes at Block 58. It should be noted that the order of certain steps in the above-described approach may be changed in different embodiments. For example, the step illustrated with respect to Block 55 of determining atmospheric instability levels may be performed earlier (e.g., between the steps represented at Blocks 52 and 53).

The instability threshold may be measured using different indices. Example instability thresholds may be as follows:
   a. Lifted Index (LI)<−6;
   b. Convective Available Potential Energy (CAPE)>1,000 J/kg;
   c. Total Totals (TT)>55;
   d. Showalter Index (SI)<−3; and
   e. K-Index (KI)>30.

However, it should be noted that while the above represent some of the more common stability indices, other indices and threshold levels may be used in different embodiments depending on the given application.

Moreover, the range between the moisture system 42 and the localized region IR2 at which a warning is triggered (i.e., when it is "approaching") may be determined in different ways. For example, it may be based upon the moisture system 42 coming within a certain number of grid spaces of the localized region IR2. Another approach is that this may be based upon a set distance from a border or point within the localized region IR2, e.g., a center point (similarly, the location of the moisture system may be measured by a leading edge thereof or a point therein). Still another approach is that the warning may be triggered based upon an estimated time to collision or overlap between the moisture system 42 and the localized region IR2. For example, the warning may be generated as soon as the moisture system 42 is within thirty minutes (or other duration) of the localized region IR2. This determination may change based upon the velocity of the moisture system 42 (i.e., the faster the moisture system 42 is moving, the farther away it will be when it reaches the thirty-minute mark, and vice-versa).

The combination of the relatively high resolution atmospheric sounding data along with the weather radar advantageously allows the processor 35 to determine when clouds are about to form in a particular area, or which direction an existing cloud system is going to move. That is, the weather radar data shows where moisture has already precipitated out of the atmosphere, i.e., where the moisture is coming from, but not necessarily where it is going or when it is going to turn into a severe weather system. However, the atmospheric sounding data allows the system 30 to determine that a cloud system is approaching negatively buoyant air, for example, which means that a cloud system may be pulled in the direction of this instability. In this regard, the system 30 may advantageously be used to provide longer lead times in terms of forecasting dangerous localized weather systems, such as with tornadoes, for example. Moreover, the system 30 may also advantageously help reduce false alarms in such instances, as it more accurately determines when all of the contributing factors are about to occur in a given localized area. Thus, not only may alerts be more accurately delivered, they may be delivered with higher granularity to only the particular areas where the instability is present to avoid overreaching alerts to adjacent regions where the severe weather is not going to occur.

In this regard, the atmospheric sounding data may be collected at relatively frequent intervals, e.g., every ten minutes or less, and more particularly every five to ten minutes, although other collection intervals may be used in different embodiments. This advantageously allows the system 30 to provide accurate near-term situational awareness of approaching severe weather and atmospheric instability.

In accordance with one example implementation, severe weather warnings and associated image display data may be streamed (e.g., over the Internet) from the processor 35 to one or more remote electronic devices 36, as shown in FIG. 2. Here, the electronic device 36 is a mobile wireless communications device (e.g., a smartphone), which has a mapping app running thereon on which the severe weather image display data is overlaid. More particularly, a severe weather indicator icon 37 and warning 38 appear on the display of the device 36 when the direction of travel of a moisture system is approaching a given localized region where the mobile electronic device 36 (and, presumably, the user or owner of the mobile electronic device) is located, which is indicated by a pin icon 39 on the map in the illustrated example. Locations of devices within a given localized region may be determined by the devices themselves (e.g., via GPS), or by proximity to a wireless network access point (e.g., a WiFi access point, a cellular base station, etc.).

It should be noted that the warning and/or image display data may streamed or otherwise provided to numerous other types of devices, such as computers (desktop, laptop, tablet, etc.) and automotive and airplane based navigation or instrumentation systems, for example. More particularly, such data may be used by private and/or commercial pilots that need to avoid severe weather conditions and unstable air masses. Other users may include Internet and cable meteorological services that provide weather forecast data to public consumers through websites, weather applications and news forecasts, as well as foreign and U.S. government professional meteorologists, for example.

In contrast to prior approaches, the system 30 may advantageously utilize satellite observed atmospheric sounding data to compute stability data that is combined with radar data for a useful and easy to understand end user product/graphical representation. Moreover, the above-described approach does not require the use of NWP modeling and its associated complexity. Moreover, other typical approaches may utilize inferences made from observed cloud cover from imagery or radar in dry-air conditions, which is generally stable and not of interest to users, and may therefore result in less helpful information or even false alarms.

Yet, the system 30 advantageously provides for a map-based representation for a graphic or mobile device application that advantageously combines observed atmospheric stability data with radar data to show current weather, as well as a depiction of developing weather conditions in the next 1-2 hours, for example. Moreover, this approach may allow the user to see at a glance where severe weather is going to start, develop or dissipate. It should be noted that other meteorological parameters may be measured using sounding or imagery instruments and combined with atmospheric stability and radar data for useful end user applications including total moisture content, winds, surface temperature and moisture, etc.

Many modifications and other embodiments will come to the mind of one skilled in the art having the benefit of the teachings presented in the foregoing descriptions and the associated drawings. Therefore, it is understood that modifications and other similar embodiments are intended to be included within the scope of the appended claims.

That which is claimed is:

1. A severe weather detection and warning method comprising:
    collecting atmospheric sounding data from at least one satellite atmospheric sounding device corresponding to a grid of localized regions, the atmospheric sounding data including geospatial location and elevation components;
    collecting weather radar data for the grid of localized regions from at least one radar station;
    determining a location and direction of travel of at least one moisture system based upon the weather radar data;
    determining respective atmospheric instability levels for the localized regions based upon the atmospheric sounding data; and
    determining when the direction of travel of the at least one moisture system is approaching a given localized region having an atmospheric instability level above an instability threshold, and generating a severe weather warning indication based thereon.

2. The method of claim 1 further comprising generating image display data representative of the direction of travel of the at least one moisture system and the severe weather warning indication.

3. The method of claim 2 further comprising streaming the image display data to at least one remote electronic device.

4. The method of claim 3 wherein the at least one remote electronic device has a device geolocation associated therewith; and wherein streaming the image display data comprises streaming image display data for the device geolocation.

5. The method of claim 1 wherein determining when the direction of travel of the at least one moisture system is approaching the given localized region having the instability level above the instability threshold is performed without using numerical weather prediction (NWP) modeling.

6. The method of claim 1 wherein the localized regions are less than five kilometers squared.

7. The method of claim 1 wherein the atmospheric sounding data comprises at least one of temperature data, moisture data and pressure data.

8. The method of claim 1 wherein the atmospheric sounding data comprises at least one of hyperspectral data and microwave data.

9. The method of claim 1 wherein collecting atmospheric sounding data comprises collecting the atmospheric sounding data every ten minutes or less.

10. The method of claim 1 wherein the at least one radar station comprises at least one ground-based radar station.

11. A severe weather detection and warning system comprising:
at least one satellite atmospheric sounding device for collecting atmospheric sounding data corresponding to a grid of localized regions, the atmospheric sounding data including geospatial location and elevation components;
at least one radar station for collecting weather radar data for the grid of localized regions; and
a server for
determining a location and direction of travel of at least one moisture system based upon the weather radar data,
determining respective atmospheric instability levels for the localized regions based upon the atmospheric sounding data, and
determining when the direction of travel of the at least one moisture system is approaching a given localized region having an atmospheric instability level above an instability threshold, and generating a severe weather warning indication based thereon.

12. The system of claim 11 wherein said server further generates image display data representative of the direction of travel of the at least one moisture system and the severe weather warning indication.

13. The system of claim 12 further comprising at least one electronic device cooperating with said processor to receive the image display data via streaming.

14. The system of claim 13 wherein the at least one remote electronic device has a device geolocation associated therewith; and wherein the streaming image display data is for the device geolocation.

15. The system of claim 11 wherein said server determines when the direction of travel of the at least one moisture system is approaching the given localized region having the instability level above the instability threshold without using numerical weather prediction (NWP) modeling.

16. A severe weather detection and warning server comprising:
at least one input device for
collecting atmospheric sounding data from at least one satellite atmospheric sounding device corresponding to a grid of localized regions, the atmospheric sounding data including geospatial location and elevation components, and
collecting weather radar data for the grid of localized regions from at least one radar station; and
a processor coupled to said at least one input device for
determining a location and direction of travel of at least one moisture system based upon the weather radar data,
determining respective atmospheric instability levels for the localized regions based upon the atmospheric sounding data, and
determining when the direction of travel of the at least one moisture system is approaching a given localized region having an atmospheric instability level above an instability threshold, and generating a severe weather warning indication based thereon.

17. The severe weather detection and warning server of claim 16 wherein said processor further generates image display data representative of the direction of travel of the at least one moisture system and the severe weather warning indication.

18. The severe weather detection and warning server of claim 17 wherein said processor further streams the image display data to at least one remote electronic device.

19. The severe weather detection and warning server of claim 18 wherein the at least one remote electronic device has a device geolocation associated therewith; and wherein said processor streams image display data for the device geolocation.

20. The severe weather detection and warning server of claim 16 wherein said processor determines when the direction of travel of the at least one moisture system is approaching the given localized region having the instability level above the instability threshold without using numerical weather prediction (NWP) modeling.

* * * * *